UNITED STATES PATENT OFFICE.

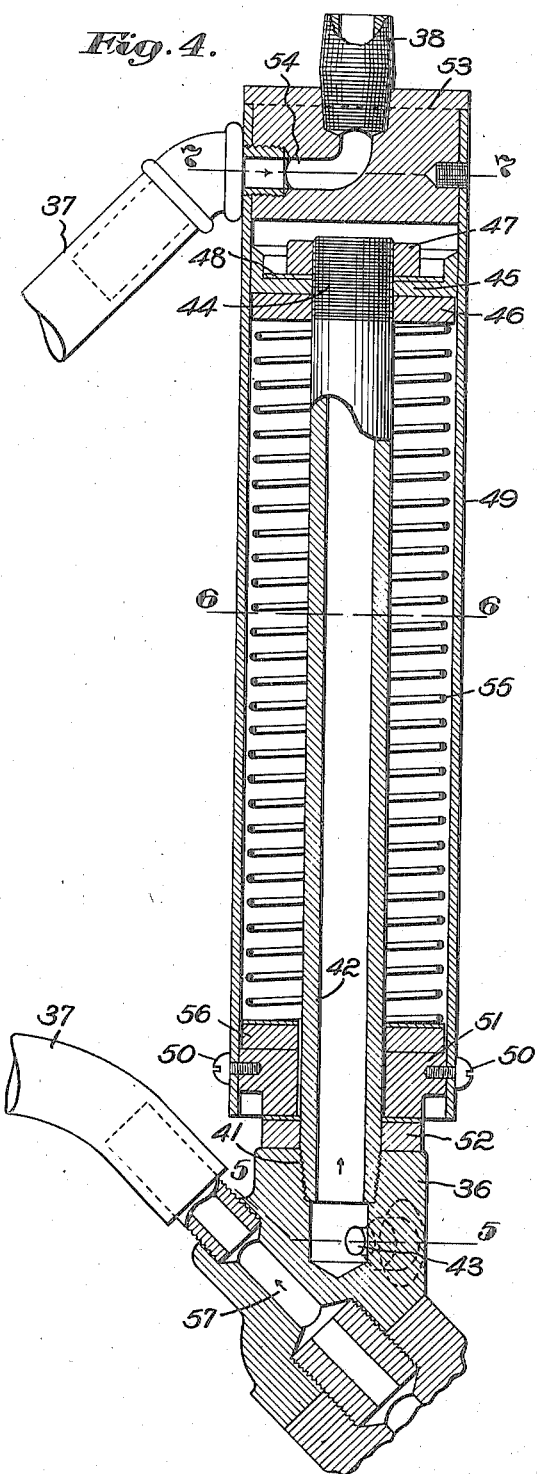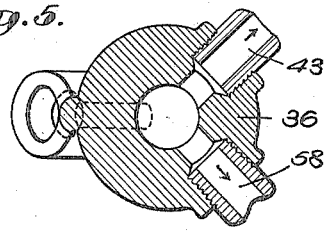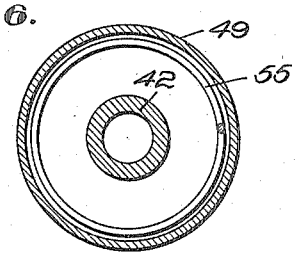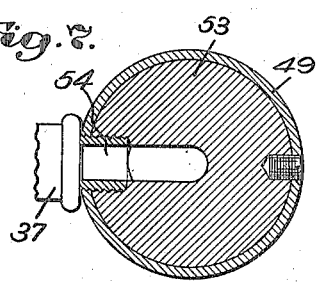

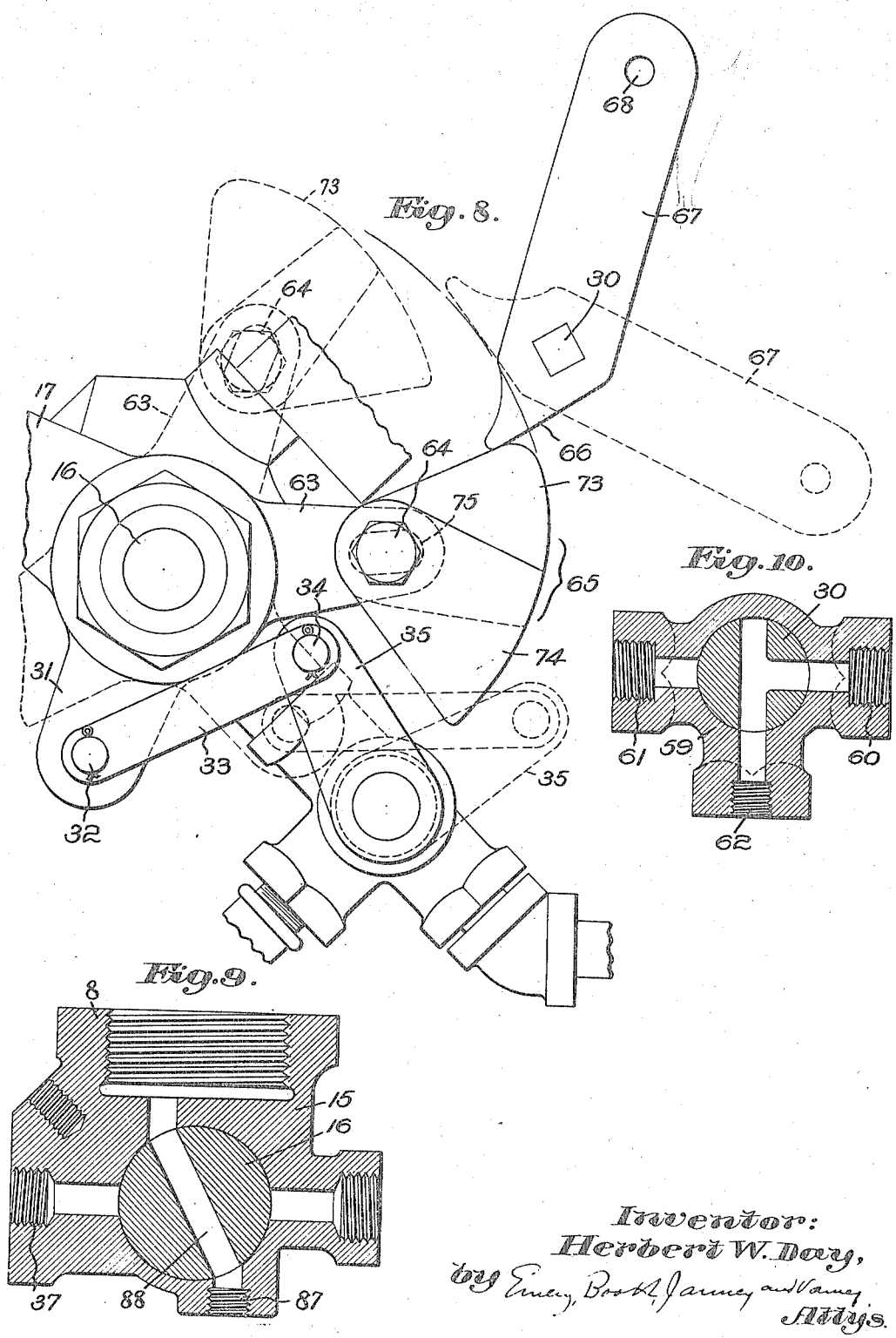

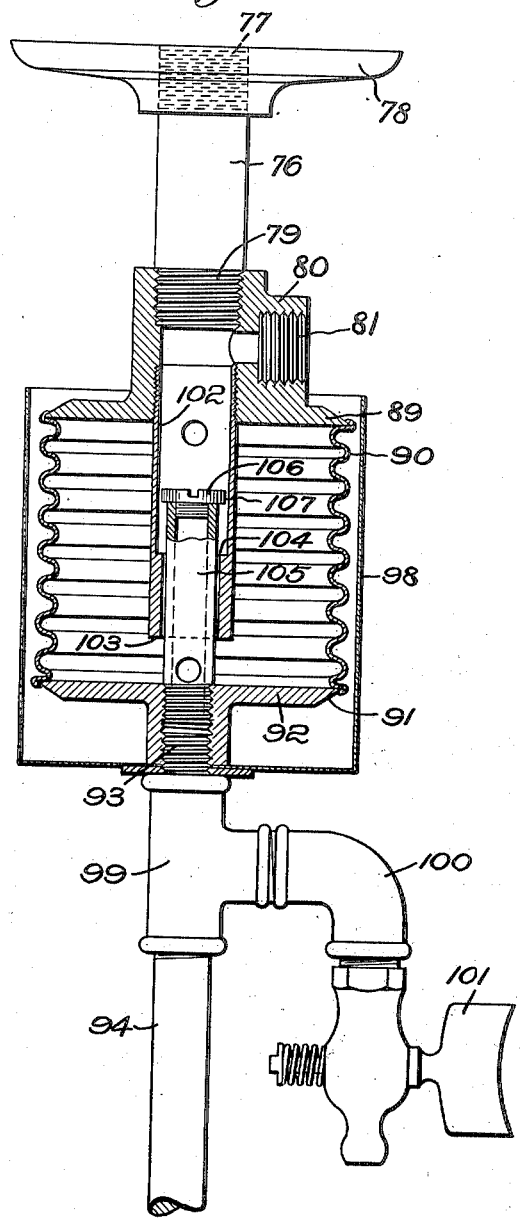
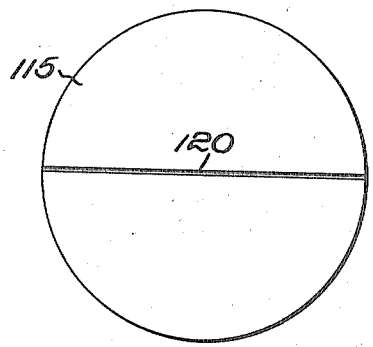
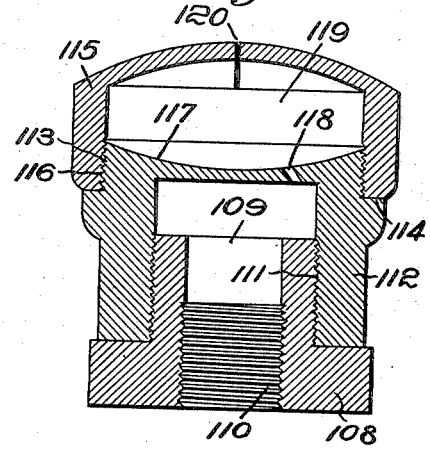
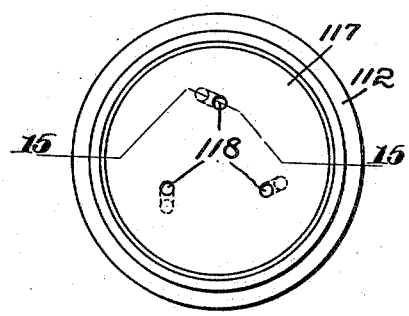
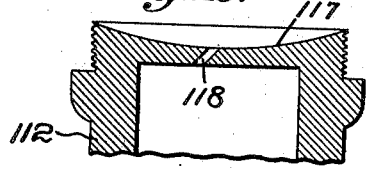

HERBERT W. DAY, OF WOLLASTON, MASSACHUSETTS, ASSIGNOR TO SPRAY ENGINEERING COMPANY, OF BOSTON, MASSACHUSETTS, A CORPORATION OF MASSACHUSETTS.

MECHANISM FOR APPLYING COATING TO SHELLS AND OTHER ARTICLES.

1,249,725.     Specification of Letters Patent.     Patented Dec. 11, 1917.

Application filed December 20, 1916. Serial No. 137,945.

*To all whom it may concern:*

Be it known that I, HERBERT W. DAY, a citizen of the United States, and a resident of Wollaston, in the county of Norfolk and State of Massachusetts, have invented an Improvement in Mechanism for Applying Coating to Shells and other Articles, of which the following description, in connection with the accompanying drawings, is a specification, like characters on the drawings representing like parts.

This invention relates to mechanism for applying paint or other coating material to shrapnel or other ammunition shells and also to other articles, and in certain aspects thereof is an improvement upon the invention disclosed in my Patent No. 1,201,219, dated October 10, 1916.

In order that the principle of my invention may be readily understood, I have disclosed certain embodiments thereof in the accompanying drawings, wherein—

Fig. 4 is a vertical elevation taken through the spray nozzle elevating mechanism;

Figure 1:
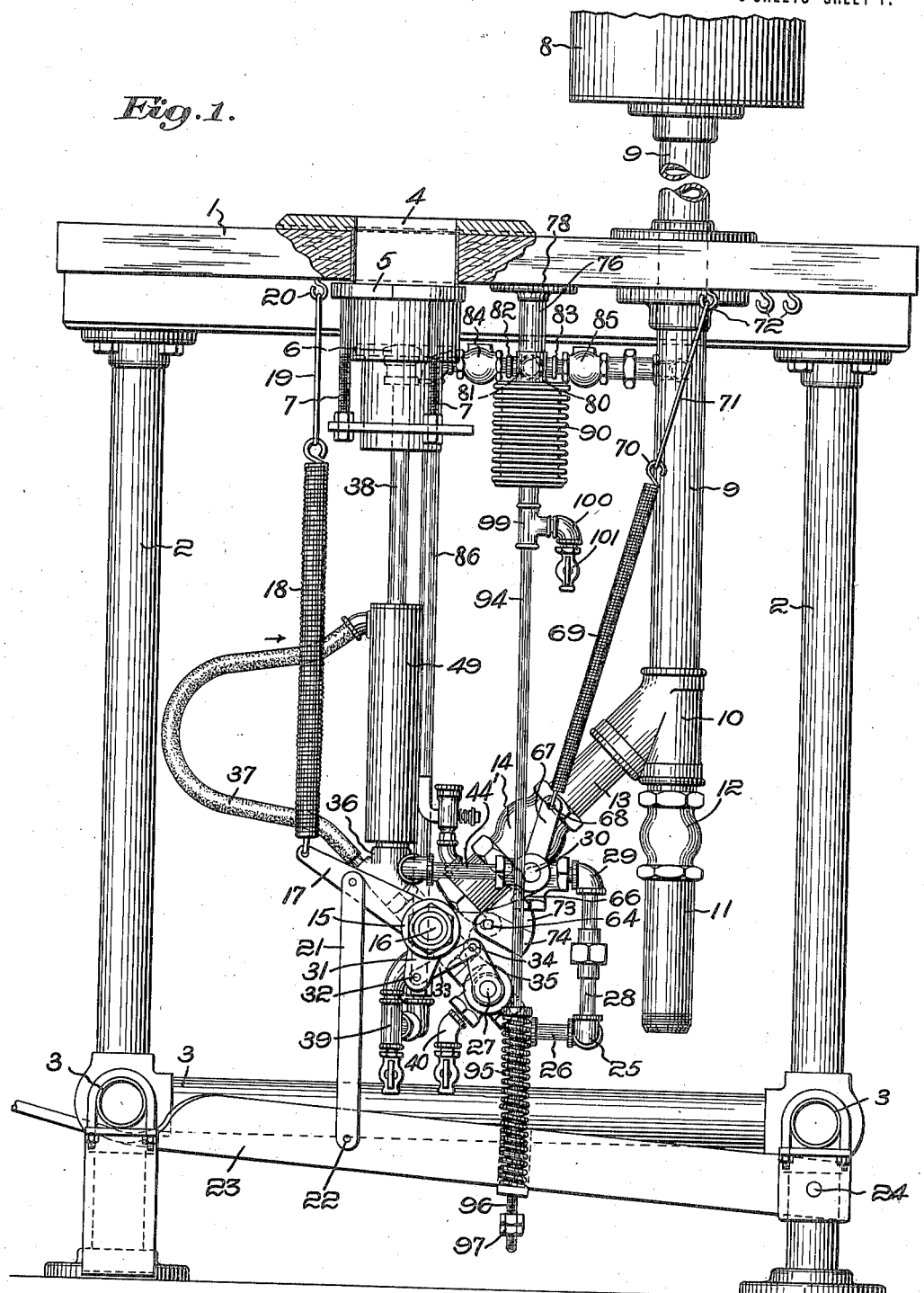
Figure 1 is a side elevation, with parts in vertical section, of coating mechanism embodying my invention.

Figs. 5, 6 and 7 are respectively transverse sections upon the lines 5—5, 6—6 and 7—7 of Fig. 4;

Fig. 8 is a view in side elevation upon an enlarged scale of the measuring valve and parts immediately associated therewith;

Fig. 9 is a transverse section taken through the measuring valve for the coating material;

Fig. 10 is a transverse section of an air valve controlling the to and fro movement of the spray nozzle;

Fig. 11 is a view mainly in vertical section of the coating material circulating pump and its connections;

Fig. 12 is a vertical sectional view of a nozzle which may be used with the coating mechanism herein disclosed;

Fig. 13 is a plan view thereof;

Fig. 14 is a plan view thereof with the cap removed; and

Fig. 15 is a detail sectional view thereof.

While I have herein represented my invention as applied to the coating of ammunition shells with paint, it is evident that the invention may be employed in other relations and in the application of a coating to articles wholly different from that herein referred to.

The invention is, however, particularly adapted to the coating of hollow articles.

Referring to that specific application or embodiment of my invention herein shown, an important object thereof is to provide means whereby a hollow article, such, for example, as an ammunition shell, may be readily coated and preferably upon its interior, so that a large number of such articles may be treated in a minimum length of time.

In my prior Patent No. 1,102,219 I have represented a mechanism of the general type herein illustrated and having means for supporting a shell into which a spray nozzle is introduced, the paint or other coating being supplied to a measuring valve or device from which a measured charge is forced by fluid pressure, such for example as a jet of compressed air.

While my present invention is not restricted thereto, I preferably provide means similar to those described in my prior patent.

Referring more particularly to the drawings, I have therein represented a table or support at 1, it being provided with suitable uprights 2 connected if desired by cross pieces 3. The said table or support 1 is provided with a suitable opening 4 extending vertically therethrough to receive the ammunition shell or other object that is to be coated. Beneath the said opening 4 is provided a suitable support 5 for the end of the shell, said support 5 being generally similar to that shown in my said patent and being hollow so as to receive therein the spray nozzle indicated in dotted lines at 6 in Fig. 1. The said support 5 is adapted for adjustment through the medium of the bolts or threaded vertical rods 7—7.

While the mechanism herein shown may be caused to function by the weight of the shell or other article to be coated, preferably the functioning of the parts is made to occur through treadle or like mechanism.

The paint or other liquid that is to be applied to the shell or other article is contained within a suitable tank 8 preferably having a loose fitting cover and supported by a discharge pipe 9 above the level of the article to be coated. The said discharge pipe 9 is tapped in or otherwise secured to the table or support 1 and passes therethrough as clearly represented in Fig. 1. Below the table 1 the discharge pipe 9 has threaded thereto a fitting 10 into which may be tapped a pipe 11 through which the contents of the tank may be drawn off if desired. The said pipe 11 is herein represented as provided with a suitable valve 12. The said fitting 10 has tapped thereinto a discharge pipe 13 having a valve 14, and has threaded onto its lower end a valve casing 15 having therein a measuring valve 16 generally similar to that shown in my said patent and not necessary fully to describe.

Extending from an exposed portion of the valve 16 is a lever arm 17 to which is connected a vertically positioned coil spring 18, the upper end whereof is connected by link 19 to a hook 20 at the under side of the table 1, said spring functioning to hold the valve 16 normally closed. Also pivotally connected to said lever arm 17 is a link 21, the lower end whereof is pivotally connected at 22 to a treadle 23 itself pivotally connected at 24 upon one of the cross pieces 3, whereby downward movement of said treadle 23 opens said valve 16.

I provide means preferably of the general character disclosed in my said patent for introducing a fluid, such as air under pressure, to force the measured charge or other supply of paint or coating to the spray nozzle. For this purpose, I preferably employ compressed air, and in that form of my invention herein shown, the air is introduced at the fitting 25 indicated in Fig. 1. From the said fitting, air is supplied in two directions, namely, through the pipe 26 to a valve 27, by which the introduction of air to the measuring valve is controlled, and through a pipe 28 and a coupling 29 to a valve 30 by which the admission of air is controlled to a plunger or cylinder mechanism for elevating the spray nozzle during the coating action thereof.

While any suitable means may be employed to operate the said valves 27, 30, I preferably provide the valve 16 with a lateral projection or arm 32, shown most clearly in Figs. 1 and 8 and pivotally connected thereto at 32 is a link 33 which is pivotally connected at its opposite end at 34 to an arm or projection 35 extending from the air control valve 27.

The construction and arrangement of the said valves and their connections are such that after the measuring or charge valve 16 has been filled and is turned into discharging position, the valve 27 is opened and thereby the charge of coating material is forced toward the spray nozzle 6, traversing in its course the fitting 36, the flexible pipe or hose 37 and the rigid vertical pipe 38. The valves 16 and 27 are provided with suitable valve controlled drain pipes 39, 40, indicated most clearly in Figs. 1 and 2.

In my Patent No. 1,201,219 hereinbefore referred to, the spray nozzle occupies a fixed position. I have provided means herein broadly claimed for relatively moving the article to be coated and the nozzle, such means preferably operating to impart to and fro movement to the nozzle within the article, while the same is being coated. While for this purpose any suitable means may be provided I have herein represented in Figs. 1, 4 to 7 inclusive and elsewhere, the fitting 36 as having tapped thereinto at 41 the lower end of a pipe 42 which is in communication through a passage 58 with the pipe 44' itself leading from the air controlling valve 30.

The upper end of the pipe 42 is threaded, as indicated at 44 to receive thereon disks 45, 46, a nut 47 and an interposed washer 48. Slidingly mounted upon said disks 45, 46 and surrounding the pipe 42 is a longitudinally movable cylinder 49 having secured to its lower end by screws 50 a head 51 adapted in the lowermost position of said cylinder to contact with a rubber or other cushion member 52 mounted upon the fitting 36. The upper end of the cylinder 49 is provided with a head 53 having therein a passage 54 extending laterally therethrough and through the wall of the cylinder 49 to receive the upper end of the flexible pipe or hose 37. Tapped into the head 53 and in communication with the passage 54 is the lower end of the pipe 38 whereon is positioned the spray nozzle 6.

Positioned within the cylinder 49 is a coiled spring 55 which is interposed between the disk 46 at the upper end of the pipe 42 and a disk 56 resting upon the lower head 51, the construction and relation of parts being such that said spring 55 tends normally to hold the cylinder 49 in the position shown in Fig. 4 or to restore it to that position after elevation thereof in the spraying action of the nozzle.

The fitting 36 is provided with a passage 57 in communication with the flexible pipe or hose 37 and by which the paint or other coating material is supplied from the measuring device to the spray nozzle.

The passage 58 constitutes means whereby air is alternately supplied to and discharged from the cylinder 49. Preferably the fitting 36 is provided with a passage 43 shown in Fig. 5 and leading to a relief or safety valve not herein shown, and which is set at any predetermined pressure.

The construction and relation of the parts thus far described are such that when or substantially when the valve 16 is open and air is admitted thereto through the valve 27, the valve 30 is also opened to admit air to the cylinder 49 and thereupon the rising movement of the spray nozzle 6 is initiated. While the movement of the nozzle 6 may be of the character desired, preferably the parts are so timed and arranged that the spraying continues throughout the upward movement of the nozzle, the air being discharged through the passage 58 and the nozzle being permitted to descend, whereupon the shell or other article that has been coated is removed, and the cycle of operations is repeated.

The air valve 30 controlling the admission of air to elevate the cylinder 49 is mounted for rotative movement in a casing 59, shown most clearly in Fig. 10, and having a passage 60 leading direct to the pipe 44, and a passage 62 leading to the exhaust. The valve 30 is a three-way valve, and in the position shown in Fig. 10 is in communication with the exhaust.

While the valve 30 or other valve controlling the movement of the spray nozzle 6 may be operated in any suitable manner, preferably I provide means whereby the same is operated in correlation with and preferably directly from the coating charge or measuring valve 16. For this purpose any suitable means may be provided. In Fig. 8, I have represented the said valve 16 as having laterally extending therefrom an arm 63 having a lug or pin 64 whereon is adjustably mounted an adjustable cam indicated generally at 65. The said cam 65 is arranged to engage a lug or projection 66 of the valve 30, said lug 66 being preferably rigid with an arm 67 having an opening 68 to receive one end of a coil spring 69, the upper end 70 whereof is connected by link 71 to one of a series of hooks or other devices herein shown as positioned at the lower face of the table 1, said hooks 72 being suitably spaced so that the link 71 may be connected to any desired hook, and thus the degree to which said valve 30 is closed may be varied as hereinafter described.

I have stated that the cam 65 is adjustably secured to the cam 16 and is itself adjustable. By the several adjustments certain important functions are secured. The said cam 65 is formed of two leaves 73, 74, each of general segmental form and each having an elongated slot 75 to receive the pin or lug 64, and with respect to which they may be moved in and out as well as in a clockwise or contraclockwise direction.

By shifting the entire valves 65 in a clockwise or contraclockwise direction about the pin or lug 64, I change the time of commencement of the motion of the cylinder 49, and hence of the spray nozzle 6. By moving the two cam leaves 73, 74 circumferentially with respect to each other, I control the length of time during which the spray nozzle 6 is moved upwardly or is held in its uppermost position through the action of the said cylinder 49. By the in and out adjustment of the cam 65 permitted by the slot 75, I control the extent of movement of the valve 30 and hence the speed of lifting movement of the spray nozzle 6. The spring 69 tends to close the valve 30, and hence to cut off the air supply after the cylinder has been elevated, and because of the provision of the series of hooks 72, I vary the extent to which the said valve 30 may be closed or rather the extent of its communication with the exhaust 62. It is evident that if the said valve 30 be turned so that its passages are in wide communication with the exhaust, the return movement of the cylinder 49 will be rapid and the smaller the area of communication between the valve 30 and the exhaust 62, the slower the return or downward movement of the spray nozzle 6.

It will be evident therefore that by the several adjustments I provide means whereby a lifting movement of the spray nozzle may commence simultaneously with the actual spraying operation through the opening of the valve 16 or at any suitable time before or after the commencement of such spraying operation.

I preferably provide means whereby I may forcibly circulate coating material through the measuring or charge valve 16 when the same is not in a position to discharge the coating material through the spray nozzle. One purpose for enforcing such a circulation is to enforce the discharge of air which might otherwise be trapped in the valve 16 or passages in direct communication therewith, and thus interfere with the accuracy of the succeeding functionings of said valve 16.

Figure 2:
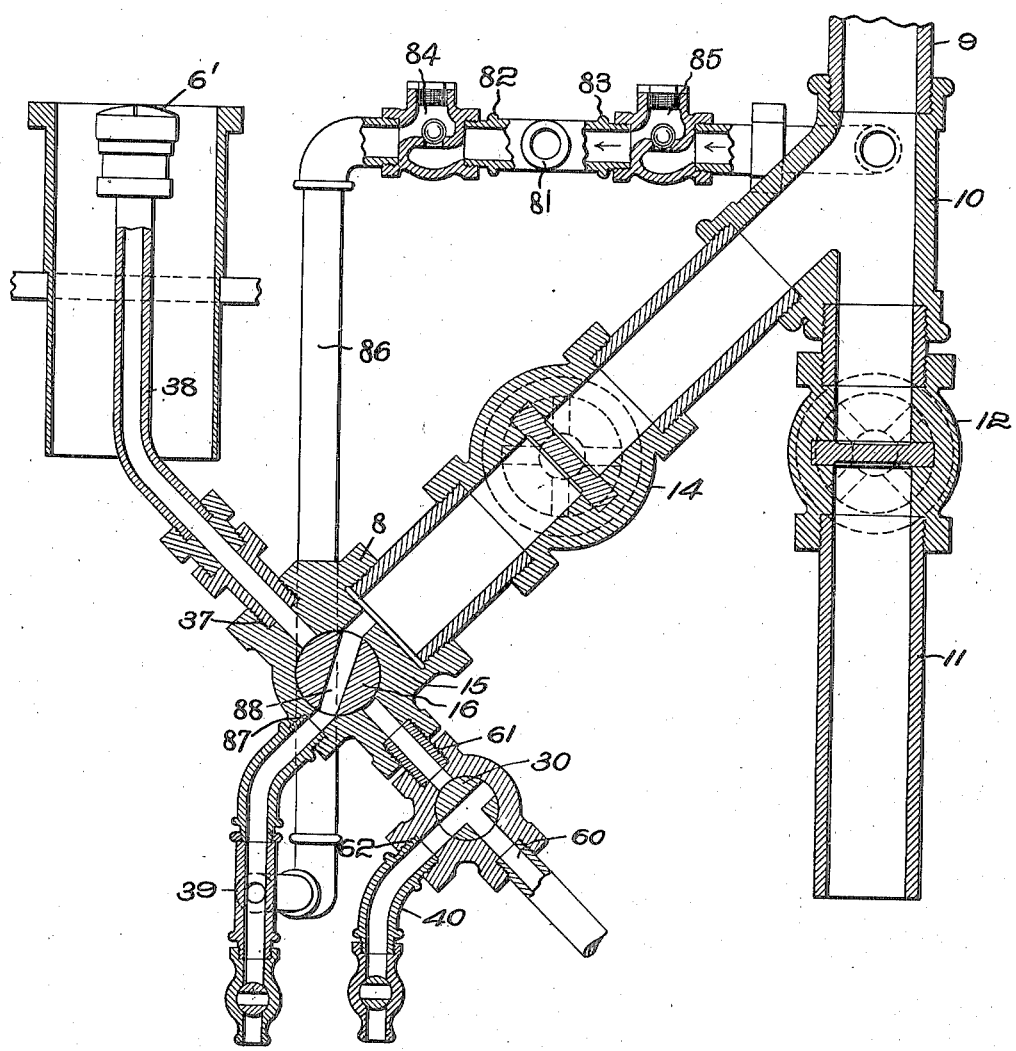
Fig. 2 is a view in side elevation, upon a larger scale, of one of the parts of the mechanism.

While for this purpose any suitable means may be provided, I have preferably provided a pump-like or bellows device in communication with the paint supply 8 and also with the said valve 16. For this purpose I have in Figs. 1 and 11 represented a rod 76, the upper end of which is threaded at 77 to a disk-like plate 78 suitably secured to the under side of the table 1. The lower end 79 of said rod 76 is also threaded and receives a fitting 80 having therein a passage 81 which is in communication with a suitable T member indicated most clearly in Fig. 1, as having laterally extending members 82, 83, each having therein a ball check valve 84, 85. The member 83 is in immediate communication with the discharge pipe 9 from the paint supply 8 and the member 82 leads to a downwardly extending pipe 86 which, as indicated most clearly in Figs. 1 and 2 is in communication with the passage 87 of the fitting 15 that receives the valve 60. When the pump-like or bellows member functions, a suitable quantity of coating material is forced through the pipe or T member 82 past the ball check valve 84 down the pipe 86 and through the pipe 87, thus entering the passage 88 through said passage 87 and also with the inlet for the paint or other coating supply, whereby any air that may be trapped in said valve is forcibly discharged therefrom and may escape from the system through the loose cover of the paint supply or reservoir 8.

The pump-like or bellows member may be of any suitable construction. The fitting 80 has a thin circumferential edge 89 about which is secured the upper end of a flexible member 90 of leather or other suitable material that may be employed for a bellows-like action. The lower edge of said member 90 is similarly secured to the thin edge 91 of a head or disk-like member which is tapped onto the threaded upper end 93 of a rod 94 which is itself connected at its lower end through a coiled spring 95 with the treadle 23 as shown most clearly in Fig. 1, the connection of the said coil spring to the treadle 23 being preferably an adjustable one by means of the threaded bolt 96 and the nuts 97.

Preferably surrounding the bellows-like member 90 is a casing 98, by which the same is protected. The said casing is supported by the rod 94, and the latter, while preferably solid throughout the greater portion of its length has as a part thereof a fitting 99 in communication through the threaded end 93 with the interior of the bellows-like member 90. Also in communication with the fitting 99 is a drain or outlet pipe 100 controlled by a valve 101 of any suitable construction.

The rod 94 being connected as described with the treadle 23, said rod is moved downwardly by said treadle when the measuring valve 16 is opened to permit the discharge of the coating material to the nozzle. Owing to the interposition of the coil spring 95, the bellows-like member 90 is extended slightly subsequent to the opening of said valve 16. The distention of said bellows member 90 opens the ball check valve 85, permitting coating material to enter said bellows, and upon return movement of the rod 94 the valve 85 is closed and the valve 84 is opened, whereby the bellows when contracted forces the coating material downward through the pipe 86 into and through said valve 16 as described. Preferably I provide means for limiting the movement of the bellows member 90 in both directions, so as to prevent liability of rupture or displacement thereof. While for thus purpose any suitable means may be provided, I have herein represented the head 80 of said bellows as having tapped thereinto a short tube 102. The length of said tube 102 is such that the lower end 103 thereof contacts with the lower head 92 at the proper time and prevents undue contraction of the bellows member 90. The inner wall of said tube 102 has an annular shoulder 104, and the fitting 92, is provided with a tube-like extension 105 positioned within the tube 102 and having tapped into its upper end a screw cap 106, the flange 107 of which is adapted upon the downward movement of the rod 94 to contact with the annular shoulder 104 and thereby prevent undue extension of the bellows member 90.

Figure 3:
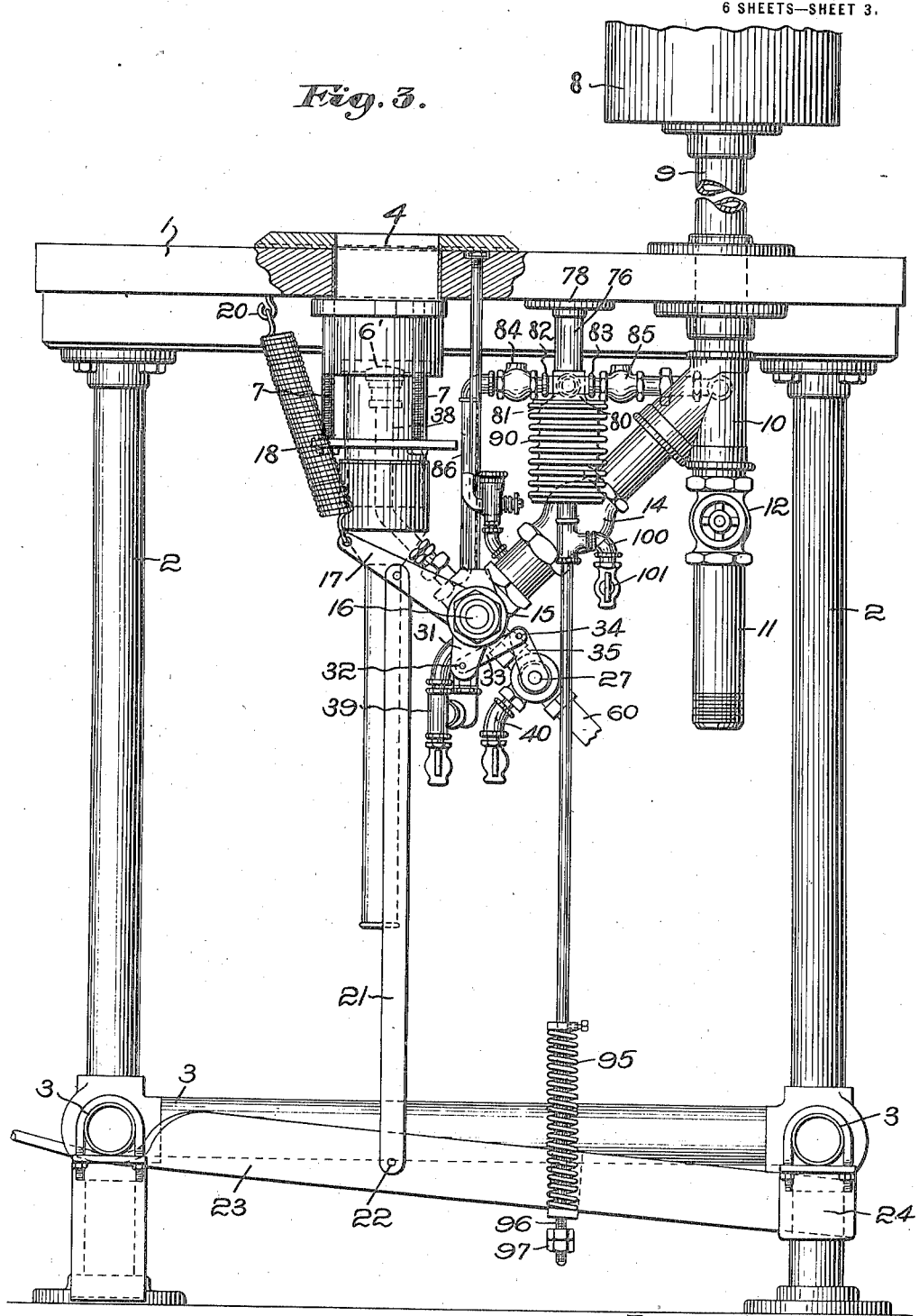
Fig. 3 is a view similar to Fig. 1 representing a somewhat modified form of the invention.

In Fig. 3, I have shown a modified form of my invention wherein the spray nozzle 6' is stationary and in this respect corresponds to the construction shown in my said Patent No. 1,201,219. In this form of my invention I have shown the circulating means described herein. I have stated that any suitable form of spraying nozzle may be provided. In Figs. 12 to 15 inclusive, I have represented one form of nozzle which may be used for my purpose. Therein I have represented a nozzle having a base portion 108 provided with a central passage 109 threaded at 110 for the reception of a hose or other supply pipe. The outer surface of said base member 108 is threaded at 111 for the reception of a body member 112 which is provided with an upper threaded end 113 and the shoulder 114 for the reception of a cap 115 interiorly screw threaded at 116. The upper face of said body member 112 is preferably dish shaped or concaved as indicated at 117, and is provided with one or more openings 118, which, as most clearly shown in Figs. 12, 14 and 15 are not only inclined with respect to a vertical axis but are also inclined circumferentially so that material entering the chamber 119 does so with a swirling motion and is thoroughly mixed in said chamber. The cap 115 is provided preferably with a single slot 120 of the full width of the cap and through said slot the thoroughly mixed material enters in a thin wide stream which is discharged in such condition against the surface of the object that is to be coated.

It will be clear from the foregoing description of the form of spray nozzle shown in Figs. 12 to 15 inclusive, that the opening or openings 118 therein are not only inclined upwardly so as to penetrate the wall or substance of the head wherein they are formed, but that they are also inclined in a general circumferential direction.

It will be clear from the foregoing description of the preferred embodiment of my invention that the coating material, of whatever nature, is applied to the article (and in the disclosed embodiment of my invention to the interior of the article) by means of a relative movement of the article and the nozzle, and preferably by movement of the nozzle. Within the scope of my invention the coating material may be applied to the external surface of the article, and if desired the article itself may be moved and the nozzle may remain stationary.

Having thus described one illustrative embodiment of my invention, I desire it to be understood that although specific terms are employed, they are used in a generic and descriptive sense and not for purposes of limitation, the scope of the invention being set forth in the following claims.

1. Mechanism for applying coating comprising an article support, a spray discharge member, means for effecting relative to and fro movement of said discharge member and said support during discharge from said spray discharge member, means for containing a predetermined quantity of coating material, and means in communication with said discharge member forcibly to discharge said material upon said article.

2. Mechanism for applying coating comprising an article support, a spray discharge member, means for effecting relative to and fro movement of said discharge member and said support during discharge from said spray discharge member, means for containing a predetermined quantity of coating material, said means being movable from filling to discharge position, and means in communication with said discharge means to discharge said material upon said article.

3. Mechanism for applying coating comprising an article support, a spray discharge member, means for effecting relative to and fro movement of said discharge member and said support during discharge from said spray discharge member, a container for a measured quantity of coating material, and means in communication with said discharge means for forcibly discharging material from said container through said discharge means onto said article.

4. Mechanism for applying coating comprising an article support, a spray discharge member, means for effecting relative to and fro movement of said discharge member and said support during discharge from said spray discharge member, a container for a measured quantity of coating material and movable from a filling position to a discharge position, and means in communication with said discharge means for forcibly discharging said material from said containing means through said discharge means onto said article.

5. Mechanism for applying coating comprising an article support, a spray discharge member, means for effecting relative to and fro movement of said discharge member and said support, during discharge from said spray discharge member, a container for a predetermined quantity of liquid coating, and fluid pressure means for ejecting the coating material from said container through said discharge means onto said article.

6. Mechanism for applying coating comprising an article support, a spray discharge member, means for effecting relative to and fro movement of said discharge member and said support during discharge from said spray discharge member, a container for a predetermined quantity of liquid coating and movable from a filling position to a discharging position, and fluid pressure means for ejecting the coating material from said container through said discharge means onto said article.

7. Means for applying liquid coating to hollow articles comprising a support for a hollow article, a nozzle adjacent to the opening thereof, means to impart relative to and fro movement to said article and said nozzle during discharge from said nozzle, a valve in connection with said nozzle constructed and arranged to receive a predetermined charge of coating, and fluid pressure means in communication with said nozzle.

8. Means for applying coating comprising an article support, a reservoir for a supply of liquid coating, a chamber valve in communication with said reservoir and constructed and arranged to receive a predetermined measured charge of coating to be discharged therefrom, a nozzle adjacent to the article upon said support, means to impart relative to and fro movement to said article and said nozzle during discharge from said nozzle, and means for forcibly ejecting the coating through said valve and said nozzle onto said article.

9. Mechanism for applying coating material comprising an article support, a nozzle adjacent thereto, means for imparting relative to and fro movement to said article support and said nozzle during discharge from said nozzle, means accessible during the operation of the mechanism for containing a predetermined quantity of coating material, and means forcibly to discharge said material through said nozzle upon the article.

10. Mechanism for applying coating material comprising an article support, a nozzle in proximity thereto, means for imparting relative to and fro movement to said article and said nozzle during discharge from said nozzle, means mounted for turning movement from receiving to discharging position and constructed and arranged to contain a predetermined quantity of coating material, and means forcibly to discharge said material through said nozzle upon said article.

11. Mechanism for applying coating material comprising an article support, a nozzle in proximity thereto, means to impart relative to and fro movement to said article support and nozzle during discharge from said nozzle, a valve for containing a predetermined quantity of coating material, and means forcibly to discharge said material from said valve through said nozzle upon said article.

12. Means for applying liquid coating comprising a support for the article to be coated, a nozzle for discharging coating onto said article, means to reciprocate said nozzle with relation to said support, a measuring valve in communication with said nozzle and constructed and arranged to receive a predetermined charge of coating material, a fluid pressure controlling valve in communication with the measuring valve, and means for moving said valve, thereby to eject the coating material through said nozzle.

13. Mechanism for applying coating comprising an article support, a nozzle in proximity thereto, co-acting means to contain and to discharge a predetermined quantity of coating material, and means for imparting relative to and fro movement to said support and nozzle during discharge from said nozzle.

14. Mechanism for applying coating comprising an article support, a nozzle in proximity thereto, co-acting means to contain and to discharge a predetermined quantity of coating material, and means to reciprocate said nozzle with respect to said support during discharge from said nozzle.

15. Mechanism for applying coating comprising an article support, a nozzle mounted to discharge material upon the inner surface of an article upon said support, co-acting means to contain and to discharge a predetermined quantity of coating material, and means to impart relative reciprocating movement to said article support and nozzle during discharge from said nozzle.

16. Mechanism for applying coating comprising an article support, a nozzle mounted to discharge material upon the inner surface of an article upon said support, co-acting means to contain and to discharge a predetermined quantity of coating material, and means to reciprocate said nozzle within the article on said support during discharge from said nozzle.

17. Mechanism for applying coating comprising an article support, a nozzle in proximity thereto, fluid pressure means to impart to and fro movement to said nozzle, and means to eject material through said nozzle during discharge from said nozzle.

18. Mechanism for applying coating comprising an article support, a nozzle in proximity thereto, a plunger connected to said nozzle and fluid pressure means to operate said plunger.

19. Mechanism for applying coating comprising an article support, a nozzle in proximity thereto, means for containing a predetermined quantity of coating material, and fluid pressure means to discharge said predetermined quantity of coating material through the nozzle and also to impart to and fro movement to said nozzle.

20. Mechanism for applying coating comprising an article support, a nozzle, fluid pressure means to impart to and fro movement to said nozzle, and treadle means controlling said fluid pressure means.

21. Mechanism for applying coating comprising a support for a hollow article, a nozzle positioned to spray the interior of such article, a cylinder and piston connected to said nozzle to reciprocate the latter, fluid pressure means to impart relative movement to said cylinder and piston, and fluid pressure means to discharge a quantity of material through said nozzle.

22. Mechanism for applying coating comprising an article support, a nozzle in proximity thereto, a cylinder and piston relatively movable and operatively connected to said nozzle to reciprocate the latter, fluid pressure means controlling said piston and cylinder, and means to vary the time of beginning the movement of the nozzle through said cylinder and piston.

23. Mechanism for applying coating comprising an article support, a nozzle in proximity thereto, a cylinder and piston relatively movable and operatively connected to said nozzle to reciprocate the latter, and means to vary the time during which the nozzle is held in extreme position at one limit of its movement.

24. Mechanism for applying coating comprising an article support, a nozzle in proximity thereto, a cylinder and piston relatively movable and operatively connected to said nozzle to reciprocate the latter, a fluid pressure valve for controlling said piston and cylinder, and means to vary the extent of movement of said valve.

25. Mechanism for applying coating comprising an article support, a nozzle in proximity thereto, a cylinder and piston relatively movable and operatively connected to said nozzle to reciprocate the latter, a fluid pressure valve for controlling said piston and cylinder, and variable means to control the amount of closure of said valve.

26. Mechanism for applying coating comprising an article support, a nozzle in proximity thereto, a cylinder and piston relatively movable and operatively connected to said nozzle to reciprocate the latter, and an adjustable cam to control said cylinder and piston.

27. Mechanism for applying coating comprising an article support, a nozzle in proximity thereto, a cylinder and piston relatively movable and operatively connected to said nozzle to reciprocate the latter, and a cam to control said cylinder and piston.

28. Mechanism for applying coating comprising an article support, means for containing a predetermined quantity of coating material, means to discharge said material from said containing means onto the article, and circulating means to force coating material periodically through said containing means.

29. Mechanism for applying coating comprising an article support, a nozzle in proximity thereto, a container in communication with said nozzle for supplying a measured quantity of coating material to the nozzle, and circulating means to enforce passage of coating material through said container in periods of inaction of said nozzle.

30. Mechanism for applying coating comprising an article support, a nozzle in proximity thereto, means in communication with said nozzle for containing a predetermined quantity of coating material, and a pump device for circulating coating material through said containing means.

31. Mechanism for applying coating comprising an article support, a nozzle in proximity thereto, means in communication with said nozzle for containing a predetermined quantity of coating material, a reservoir for coating material, and means in communication with said reservoir and said containing means for circulating material in one direction through said containing means in periods of inaction of said nozzles.

32. Mechanism for applying coating comprising an article support, a spray discharge member, means for effecting relative movement of said discharge member and said support during discharge from said spray discharge member, means for containing a predetermined quantity of coating material, and means in communication with said discharge member forcibly to discharge said material upon said article.

33. Mechanism for applying coating comprising an article support, a spray discharge member, means for effecting movement of said spray discharge member during discharge from said member, means for containing a predetermined quantity of coating material, and means in communication with said discharge member forcibly to discharge said material upon said article.

34. Mechanism for applying coating comprising an article support, a spray discharge member, means for effecting to and fro movement of said spray discharge member during discharge therefrom, means for containing a predetermined quantity of coating material, and means in communication with said discharge member forcibly to discharge said material upon said article.

35. Mechanism for applying coating comprising an article support, a coating discharge member, means for effecting relative movement of said discharge member and said support during discharge from said member, means for containing a predetermined quantity of coating material, and means in communication with said discharge member forcibly to discharge said coating material.

36. Mechanism for applying coating comprising an article support, a coating discharge member, a co-acting container for a predetermined quantity of coating material, and means to impart relative to and fro movement to said discharge member and said support during discharge from said member.

37. Mechanism for applying coating comprising an article support, a coating discharge member, a co-acting container for a predetermined quantity of coating material, and means for imparting relative movement between said support and member into and out of the article supported by said member during discharge from said member.

38. Mechanism for applying coating comprising an article support, a coating discharge member, a fluid pressure operated means to impart relative movement to said discharge member and said support during discharge from said member to effect the coating of the interior of the article upon said support.

39. Mechanism for applying coating comprising an article support, a coating discharge member, and fluid pressure operated means to impart relative to and fro movement to said support and member to coat the interior of the article upon said support.

40. Mechanism for applying coating comprising an article support, a coating discharge member, co-acting means to contain a predetermined quantity of coating material, and means to impart relative movement to said support and member in a vertical path during discharge from said member.

41. Mechanism for applying coating comprising an article support, a coating discharge member, and fluid pressure means to impart relative movement to said support and member during discharge from the member.

42. Mechanism for applying coating comprising an article support, a nozzle in proximity thereto, and means including a fluid actuated piston to reciprocate said nozzle in a straight path with respect to said support.

43. Mechanism for applying coating comprising an article support, a nozzle in proximity thereto, and fluid actuated means to reciprocate said nozzle in a vertical path with respect to said support.

44. Mechanism for applying coating comprising an article support, a nozzle in proximity thereto, co-acting means to contain a predetermined quantity of coating material, and means to move the nozzle up and down within the article during discharge from said nozzle.

In testimony whereof, I have signed my name to this specification.

HERBERT W. DAY.